(12) United States Patent
Brice et al.

(10) Patent No.: US 10,941,936 B2
(45) Date of Patent: Mar. 9, 2021

(54) GAS BURNER SYSTEM FOR A PLURALITY OF GAS TYPES

(71) Applicants: Martin Brice, Charlotte, NC (US); Stephan Richter, Charlotte, NC (US); Eddie Wilson, Charlotte, NC (US); Tharwat Saad, Huntersville, NC (US)

(72) Inventors: Martin Brice, Charlotte, NC (US); Stephan Richter, Charlotte, NC (US); Eddie Wilson, Charlotte, NC (US); Tharwat Saad, Huntersville, NC (US)

(73) Assignee: Gas-Fired Products Inc., Charlotte, NC (US)

( * ) Notice: Subject to any disclaimer, the term of this patent is extended or adjusted under 35 U.S.C. 154(b) by 258 days.

(21) Appl. No.: 15/407,638

(22) Filed: Jan. 17, 2017

(65) Prior Publication Data
US 2018/0202654 A1 Jul. 19, 2018

(51) Int. Cl.
F23D 14/20 (2006.01)
F23D 14/64 (2006.01)
F23K 5/00 (2006.01)

(52) U.S. Cl.
CPC ............. F23D 14/20 (2013.01); F23D 14/64 (2013.01); F23K 5/007 (2013.01); F23D 2203/007 (2013.01)

(58) Field of Classification Search
CPC ................. F23D 14/20; F23K 5/007
USPC ........................................ 431/354
See application file for complete search history.

(56) References Cited

U.S. PATENT DOCUMENTS

| 4,629,413 A * | 12/1986 | Michelson | F23C 7/02 431/10 |
|---|---|---|---|
| 9,134,026 B2 * | 9/2015 | Blaauwwiekel | F23N 1/022 |
| 2008/0124668 A1 * | 5/2008 | Schultz | F23N 1/027 431/89 |
| 2013/0224669 A1 * | 8/2013 | Ponzi | F23D 14/08 431/18 |
| 2014/0345704 A1 * | 11/2014 | Kahler | F16K 5/0207 137/15.24 |

* cited by examiner

Primary Examiner — Jason Lau
(74) Attorney, Agent, or Firm — Clements Bernard Walker; Christopher L. Bernard

(57) ABSTRACT

The present invention is a system that utilizes high pressure gas (greater than ½ psig) to control flow rate and gas discharge velocity to enable interchangeability between a plurality of gases without having to change the gas/air mixing venturi size or air opening. A new approach is to use the available incoming higher gas pressure to the appliance then control the volumetric flow rate with the first orifice and then use a second orifice to change the velocity of discharge into the gas/air mixing venturi of the burner and therefore have adjustability of gas air mixing conditions without having to change the burner system or air flow control even when changing between very different fuel gases.

16 Claims, 2 Drawing Sheets

FIGURE 2    FIGURE 3    FIGURE 4    FIGURE 5

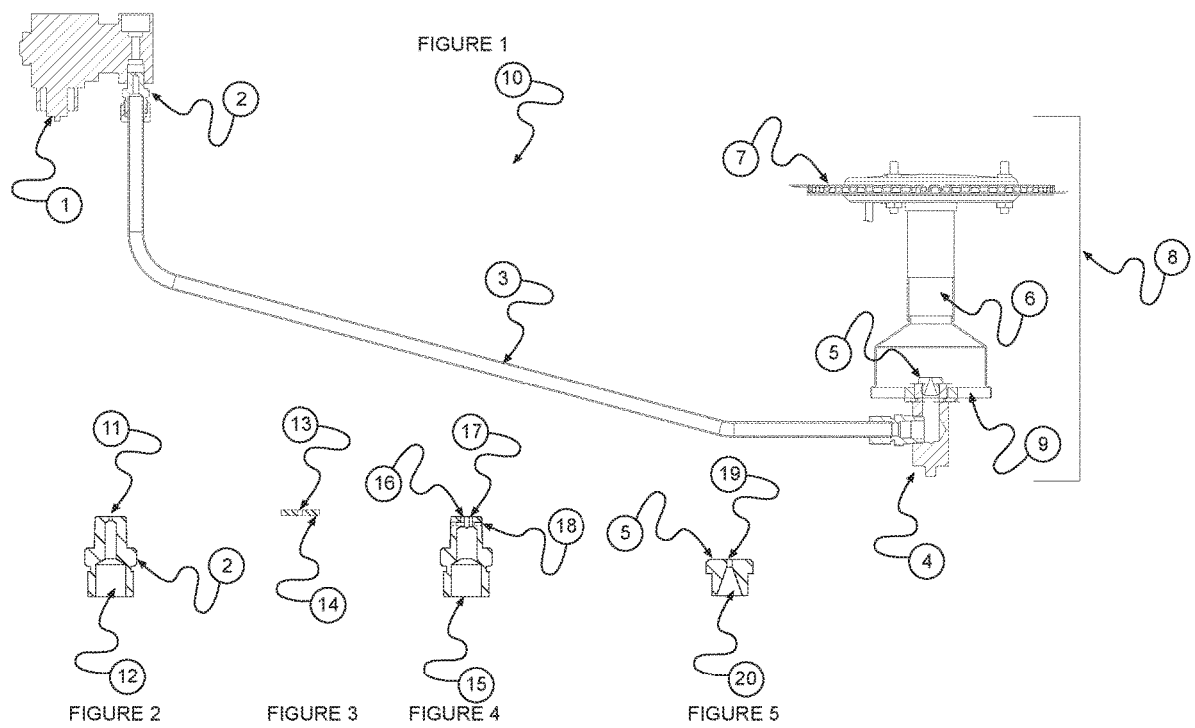

GAS BURNER SYSTEM FOR A PLURALITY OF GAS TYPES

FIELD OF THE INVENTION

The present invention is a system that utilizes high pressure gas (greater than ½ psig) to control flow rate and gas discharge velocity to enable interchangeability between a plurality of gases without having to change the gas/air mixing venturi size or air opening.

BACKGROUND

Gas burner systems are typically designed for different individual gas types i.e. Propane, Butane, Natural Gas and in Europe blended gases such as G25 which is a mixture of Natural Gas and Nitrogen. Low pressure (under 14" w.c.) atmospheric burners with and without draft inducers are dependent on the velocity of gas leaving the orifice to entrain the air for combustion. Because the different gases have different physical properties the volume of air to fuel ratio referred to as the flammability limits for gases is different for each gas type.

Commonly in order to achieve the combustion characteristics desired for each of these fuels it is necessary to make an adjustment between the air openings in the burner, the burner venturi diameter (or throat diameter) and the discharge gas pressure from the orifice. The effect of these changes is to make each of the designs potentially unique to the gas type supplied. For example Propane $C_3H_8$ fuel has a specific gravity of 1.562 and requires 23.8 times the volume of air to fuel for perfect combustion whereas Methane $CH_4$ (Natural Gas) has a specific gravity of 0.554 and requires 9.53 times the volume of air to fuel for perfect combustion. Typically, in low pressure atmospheric burners Propane is discharged at a pressure of 10.0" w.c. or greater whereas Natural gas is discharged between 2.5" and 6.0" w.c.

The fuels also have different calorific values where Propane $C_3H_8$ fuel has a gross calorific value of 2524 Btu/ft$^3$ and Methane $CH_4$ (Natural Gas) has a gross calorific value of 1012 Btu/ft$^3$. The difference in the calorific values of the fuels requires that the orifice sizes are fixed to a certain diameter at a set pressure to give a specific volumetric flow rate which determines the total heat input to the burner system. The orifice diameter and setting pressure combine to give a fixed velocity of discharge from the orifice of the gas which cannot be adjusted without changing both the diameter and pressure to give the same volumetric flow rate.

The combination of specific gravity and calorific value is given by the Wobbe Index values which is the indices used to determine the interchangeability of fuels. The Wobbe Index value $I_W$ of a fuel gas is calculated by $$I_W = \frac{V_C}{\sqrt{G_S}}$$

where $V_C$ is the gross calorific value, $G_S$ is the specific gravity of the fuel gas. If two fuels have identical Wobbe Indices then they are theoretically interchangeable at the same pressure to give the same heat input. The interchangeability of fuels will become even more challenging if LNG (liquid Natural Gas) and CNG (Compressed Natural Gas) are distributed with a wider tolerance of Wobbe Index values than the traditional supplied Natural Gas that appliances are currently designed for.

In the event that different value gases are used in the same burners systems adjustments are necessary to not only maintain heat input rate but also flame stability where the discharge speed from the burner port must be controlled so that it is not too fast which will cause a flame to lift from the port and extinguish or too slow that the flame can light back inside the burner causing incomplete combustion.

The interchangeability becomes a challenge in the event that burners need to be converted between fuel types retrospectively. This is particularly common where an existing application is designed for Propane and in the future Natural Gas becomes available at which point the unit will need to be converted. It is common in this case to change the orifice size and have a means to adjust the gas pressure to the orifice by means of a pressure regulator. It becomes more complicated for field retrofit if the actual gas/air mixing venturi system has to be replaced or mechanically modified to enable interchangeability. In certain instances, the entire gas train has to be replaced with a gas train suitable for the fuel if the pressure regulator is not adjustable to the pressure desired. The future challenge with wider range of Wobbe index gas types is that the adjustment necessary to maintain good flame stability and maintain heat input rates with current burner technology will require the use of an air control device (such as a shutter) or different venturi diameter or burner dimensions.

This invention makes use of the fact that gas supply distribution systems are at higher pressures than the pressure used at the appliance from 2 psi upwards and typically when the gas is distributed within the building it is reduced by a regulator externally to ½ psig (14" w.c.). The system disclosed takes advantage of the availability of higher pressure gas where gas can be distributed within the building at the available higher pressure to the appliance.

Gas burner systems that incorporate heat exchangers and/or are to be vented outdoors may have to employ a draft inducer to move the combustion air and combustion gasses through the system. A draft inducer is designed to overcome the flow resistance of the combustion gasses inside a heat exchanger and/or overcome the resistance of a chimney.

SUMMARY OF THE INVENTION

A new approach is to use the available incoming higher gas pressure to the appliance then control the volumetric flow rate with the first orifice and then use a second orifice to change the velocity of discharge into the gas mixing venturi of the burner and therefore have adjustability of gas air mixing conditions without having to change the burner system or air flow control even when changing between very different fuel gases.

With the present invention, the gas is supplied to the appliance at a regulated pressure higher than the pressure it will operate at. Typically, 2 psig or greater supply pressure. The present system incorporates combination of a first orifice where the diameter is specific to give a fixed volumetric flow rate for a specific fuel at a specific supply pressure communicating with gas shut off device to isolate the gas when the appliance is not in operation and a second orifice with a larger diameter that is the specific diameter to control the discharge speed for a specific fuel gas into the gas mixing venturi of the burner system.

BRIEF DESCRIPTION OF THE DRAWINGS

The drawings are to help illustrate the concepts of the present invention but are not intended to be an accurate dimensional representation of the gas burner system.

FIG. 1 is a partial sectional view of the gas burner system of the invention.

FIG. 2 is an enlarged sectional view of the first orifice (2) shown in FIG. 1.

FIG. 3 is a sectional side view of an optional first orifice (2).

FIG. 4 is sectional side view of another optional first orifice (2) with multiple outlet openings.

FIG. 5 is an enlarged sectional view of the second orifice (5) as shown in FIG. 1.

DESCRIPTION OF THE GAS BURNER SYSTEM

Figure 6:
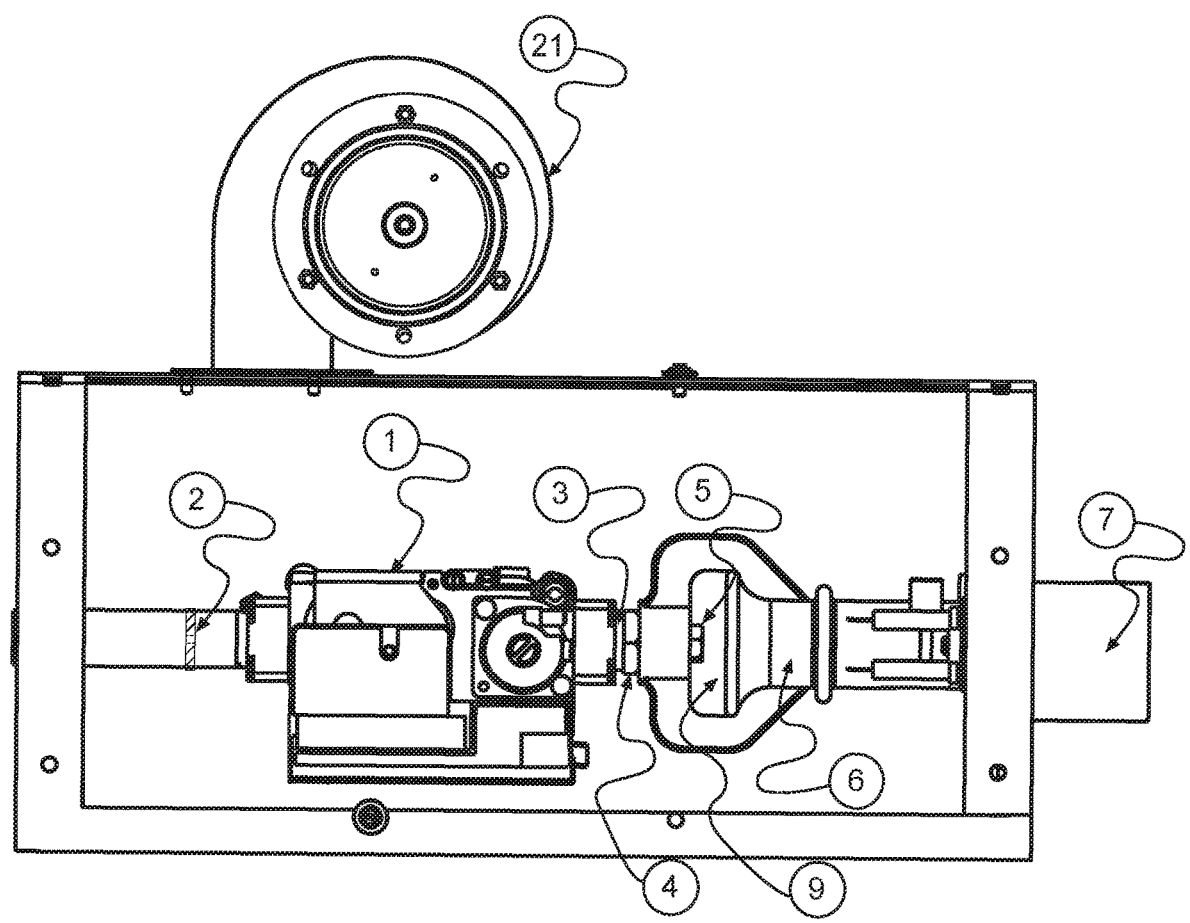
FIG. 6 is a partial sectional view of the gas burner system of the invention incorporating a draft inducer.

The system of the present invention has a gas valve to isolate the gas when the appliance is not in operation, a first small diameter precise drilled orifice that controls the volumetric flow rate of the gas. The first orifice can be one of many different diameters depending on the fuel gas and pressure supplied to the appliance. The gas is transported to the second larger diameter precise drilled orifice which controls the discharge velocity of the gas into a gas/air mixing venturi device.

The system can be adapted to interchange between any plurality of fuel gases such as Natural Gas, Propane and Butane without the need to change any of components in the system other than the first and second orifice. The fitting for the first orifice can be arranged to have multiple diameter holes where the holes can be plugged to make the change between gases possible with only changing the second orifice.

In viewing FIG. 1 of the drawing the gas burner system of the present invention is indicated by reference numeral 10. A gas valve 1 is connected to a gas source, not shown. A first orifice 2 may be connected to either the inlet or the outlet of gas valve 1 or may be positioned anywhere in the assembly prior to a second orifice 5, as long as it is fluidly connected with the gas flow. As shown in FIG. 2 the first orifice (2) has a small opening 11 at one end communicating with the controlled volumetric flow side and can have a larger opening 12 at the other end communicating with the supply pressure, it could be positioned either with the small opening towards the gas valve or away from the gas valve. As shown in FIG. 3 the orifice (2) may optionally be a small hole 13 in a single disc 14 which is mechanically held in place either before or after the gas valve 1. Optionally first orifice 2 may have the configuration shown in FIG. 4, wherein the first orifice 2, can be a single fitting 15, having a plurality of holes 16 and 17 wherein one or more of the individual holes 16 and 17 can be plugged 18, if desired, to enable a single fitting 15 to be suitable for a plurality of fuel gases or supply pressures. The function of the first orifice is to control the volumetric flow rate of the fuel gas supplied at a pressure higher than ½ psig.

As shown in FIG. 1, a hollow tube 3 fluidly communicating with the first orifice 2 and the burner assembly 8. The burner assembly 8 has a gas connection device 4 fluidly connected to tube 3, thus capable of supplying gas to the burner assembly. Positioned within the connection device 4 is a second orifice 5 that delivers the gas to the gas/air mixing venturi 6. As illustrated in FIG. 5, the second orifice 5 has a small opening 19 and a larger opening 20. The size of the small opening 19 of the second orifice 5 is larger than the small opening 11 of the first orifice 2. As shown in FIG. 3 the second orifice 5 may optionally be a small hole 13 in a single disc 14 which is mechanically held in place immediately prior to the gas/air mixing venturi 6. The function of the second orifice is to control the discharge velocity for a specific gas.

The gas/air mixing venturi 6 has an air intake opening 9 sized to permit proper mixing of the gas (from second orifice 5) with the air. The flow of air into the gas/air mixing venturi occurs because the air is entrained or induced into the mixing apparatus due to the flow of gas out of the second orifice 5. The gas/air mixing venturi 6 is fluidly connected to burner 7. The details of the burner 7 do not constitute any specific part of the present invention, other than the requirement of a burner. Thus, the burner assembly 8 constitutes the gas connection device 4, the gas/air mixing venturi 6, the second orifice 5, air intake opening 9 and the burner 7.

As shown in FIG. 6 is an alternate gas burner assembly incorporating a draft inducer 21.

Thus, in accordance with the details and scope of the present invention, all features, details and obvious variations of the present invention are within the scope of the present invention.

What is claimed is:

1. A gas burner system that is supplied with a pressure higher than ½ psig comprising a first orifice having a diameter hole of specific size to control the volumetric flow rate of a specified fuel gas and a gas connection device, a hollow tube having a first end and a second end, the first end of the hollow tube is engaged to the first orifice and the second end of the hollow tube is engaged to the gas connection device, the first orifice has a first end that is in fluid communication with the gas flow into the system and the second end is engaged to the first end of the hollow tube, the first orifice is spaced-apart and separate from the gas connection device, wherein the hollow tube physically separates the first orifice and the gas connection device, a second orifice positioned within the gas connection device, the second orifice is a specific size to control the discharge velocity of the gas into a gas/air mixing venturi, including an air intake opening to uniformly mix the air and the gas, and a burner to burn the gas/air mixture, whereby both the first and second orifices have a small opening and a larger opening, wherein the small opening of the first orifice is smaller than the small opening of the second orifice, and wherein the small opening of the second orifice is oriented such that it is closer to the gas/air mixing venturi than its larger opening.

2. The gas burner system of claim 1 wherein the first orifice is connected to the outlet of a gas valve.

3. The gas burner system of claim 1 wherein the first orifice is connected to the inlet of a gas valve.

4. The gas burner system of claim 1 whereby the second orifice entrains air through the air intake opening due to the velocity of the gas entering the gas/air mixing venturi.

5. The gas burner system of claim 1 whereby the first orifice fitting has a plurality of holes which can be mechanically plugged to enable use of a plurality of fuel gases.

6. The gas burner system of claim 1 whereby the first orifice fitting has a plurality of holes which can be mechanically plugged to enable use of a plurality of gas pressures for a single fuel.

7. The gas burner system of claim 1 whereby the fuel gas conversion is accomplished by only changing the first and second orifices, but without alteration to the gas/air mixing venturi.

8. The gas burner system of claim 1 whereby there is no draft inducer for combustion air.

9. The gas burner system of claim 1 whereby there is a draft inducer for combustion air.

10. The gas burner system of claim 1 where there is a plurality of gas burner systems each with a second orifice using a single first orifice.

11. A gas burner system that is supplied with a pressure higher than ½ psig comprising:
   a first orifice with a first end and a second end having a diameter hole of specific size to control the volumetric flow rate of a specified fuel gas;
   a burner assembly comprising:
      a gas connection device spaced apart and separate from the first orifice;
      a gas/air mixing venturi, including an air intake opening to uniformly mix the air and the gas;
      a second orifice;
      an air intake opening; and
      a burner, wherein the second orifice is positioned within the gas connection device, the second orifice is a specific size to control the discharge velocity of the gas into the gas/air mixing venturi;
   a hollow tube having a first end and a second end, the first end of the hollow tube is engaged to the first orifice and the second end of the hollow tube is engaged to the gas connection device, the first end of the first orifice is in fluid communication with the gas flow into the system and the second end is engage to the first end of the hollow tube, the gas connection device receives the second end of the hollow tube wherein the hollow tube physically separates the first orifice and the gas connection device.

12. The gas burner system according to claim 11, wherein the first orifice has a small opening and a larger opening.

13. The gas burner system according to claim 11, wherein the second orifice has a small opening and a larger opening.

14. The gas burner system according to claim 11, further comprising a gas valve, wherein the first orifice is connected to the gas valve.

15. The gas burner system according to claim 11, wherein the first orifice may be a small hole in a single disc which is mechanically held in place either before or after the gas valve.

16. The gas burner system according to claim 11, wherein the first orifice can be a single fitting having a plurality of holes.

\* \* \* \* \*